June 5, 1962
P. H. PELLEY
3,037,897
METHOD OF MAKING STRUCTURAL PANEL ARTICLES
Filed April 8, 1957
2 Sheets-Sheet 1
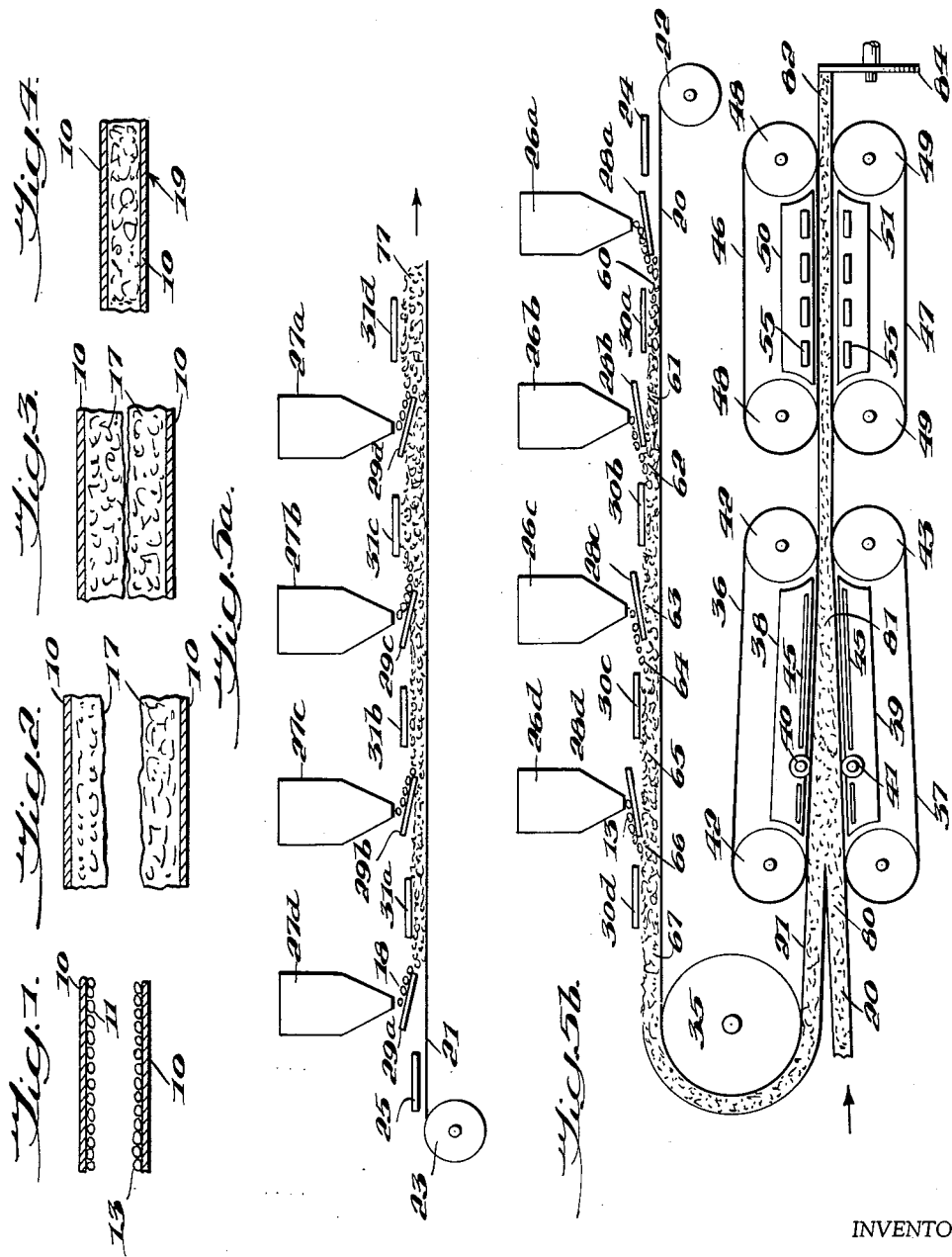
INVENTOR
PERRY H. PELLEY,
BY Wm. P. Spielman
ATTORNEY June 5, 1962 P. H. PELLEY 3,037,897
METHOD OF MAKING STRUCTURAL PANEL ARTICLES
Filed April 8, 1957 2 Sheets-Sheet 2

INVENTOR.
PERRY H. PELLEY
BY
Wm. P. Spielman
Attorney

United States Patent Office 3,037,897
Patented June 5, 1962

3,037,897
METHOD OF MAKING STRUCTURAL PANEL ARTICLES
Perry H. Pelley, Wichita, Kans., assignor to Tru-Scale, Inc., Wichita, Kans., a corporation of Kansas
Filed Apr. 8, 1957, Ser. No. 651,270
7 Claims. (Cl. 156—78)

This invention relates to a method for continuously making structural panel articles and more particularly to a method for making such articles from thermoplastic foamable beads and webs of thin flexible sheet material.

Structural panels have many uses in industry and serve, for example, as tops, interior and exterior walls for buildings, doors or panels in doors, and the like. A principal application for structural panels is in the packaging field wherein it is desirable to provide a thin light weight structural panel having a maximum of strength for a minimum of weight and cost. Heretofore it has been conventional to use cardboard or paper corrugated and laminated between flat cardboard or paper facing sheets to provide a laminated structural panel, generally referred to as a corrugated cardboard, suitable for making boxes.

The instant invention is an improvement and modified form of one embodiment in my copending application Serial No. 651,222, filed April 8, 1957, now abandoned. It provides material which can advantageously be used for structural panels of all sorts and finds particularly useful application in the packaging field where panels according to the invention may be formed into boxes of a wide variety of dimensions for packaging articles of many different sorts, as disclosed for example in U.S. Patent 2,770,406.

Panels made in accordance with the invention may be used as wall, ceiling and floor tiles, as structural panels in aircraft and automobiles, for example, as floor panels in automobile, truck, and cab bodies wherein in some cases plywood, for example, has been heretofore used.

According to a preferred embodiment each of two webs of a facing sheet material such as paper are simultaneously continuously advanced and continuously provided with a layer of spherical beads of foamable polystyrene, preferably relatively sparsely distributed on the webs so that the beads in the layer are in contact with one another in a minimum of instances, each bead having incorporated therein a foaming agent adapted to cause each bead to expand into a much larger beadlike mass of foamed polystyrene upon heating. Each of the layers thus provided is heated at about 160° to 250° F. for from about 1 second to about 10 minutes and as a result of such heating each of the beads is caused to become foamed. An additional sparsely distributed layer of beads is then provided on each web and the webs are then heated again. This process is repeated as many times as necessary to provide a web of foamed plastic on each web of paper. If desired each bead may be coated with adhesive prior to being deposited on the paper web so that after foaming, a thin layer of adhesive resinous material exists between each small mass of foam which theretofore had been a bead and each adjacent such mass. Each layer may be formed without prior admixture with such resinous adhesive material and if so, one of the webs of such foam may then be coated with adhesive if desired. Alternatively, the paper webs may be coated with adhesive before beads are deposited thereon. However, in the preferred embodiment, no adhesive is utilized and the paper webs are heated before beads are deposited thereon so that the beads are deposited on hot paper webs, this being done to insure adhesion of the foam to the web.

One of the webs is then placed on top of the other or continuously advanced into adjoining contact with the other in such manner that the two plastic masses or webs adjoin and the two paper faces are outermost. The resultant assembly is then subjected to pressure such as between belts maintained in place with shoes, while heating to provide a temperature in the beads of from 180° to 240° F. maintained for from about .02 of a second to as much as 30 seconds or even 4 or 5 minutes. Such pressure causes initial compression of the two plastic masses to provide a thickness reduced by at least 5% and as much as 75% or more from the thickness before subjecting to pressure. Additional foaming in accordance with a particularly useful embodiment may take place while such reduced thickness is maintained. The assembly is then cooled while being passed between means such as belts to prevent expansion and to maintain the thickness previously obtained.

It is therefore an object of this invention to provide a structural panel incorporating foamed plastic and a method of making same.

Another object is to provide a sheet of structural material comprising two parallel sheets of paper, or other sheet material having a foamed plastic core interposed thereinbetween.

Further objects will become apparent from the drawings and the following detailed description in which it is my intention to illustrate the applicability of the invention without thereby limiting its scope to less than that of all those equivalents which will be apparent to one skilled in the art.

In the drawings like reference numerals refer to like parts and:

FIGURE 1 is a cross-sectional view of an assembly which may be treated to provide a structural panel according to the invention;

FIGURE 2 is a cross-sectional view of elements formed by heating the elements of FIGURE 1 which are adapted, by further treatment, to provide a structural panel according to the invention;

FIGURE 3 is a cross-sectional view of the elements of FIGURE 2 placed in contact;

FIGURE 4 is a cross-sectional view of a structural panel according to the invention made by heating and pressing the elements of FIGURE 3;

FIGURES 5a and 5b are a schematic representation of a continuous process for making panel articles according to the invention;

Figure 6:
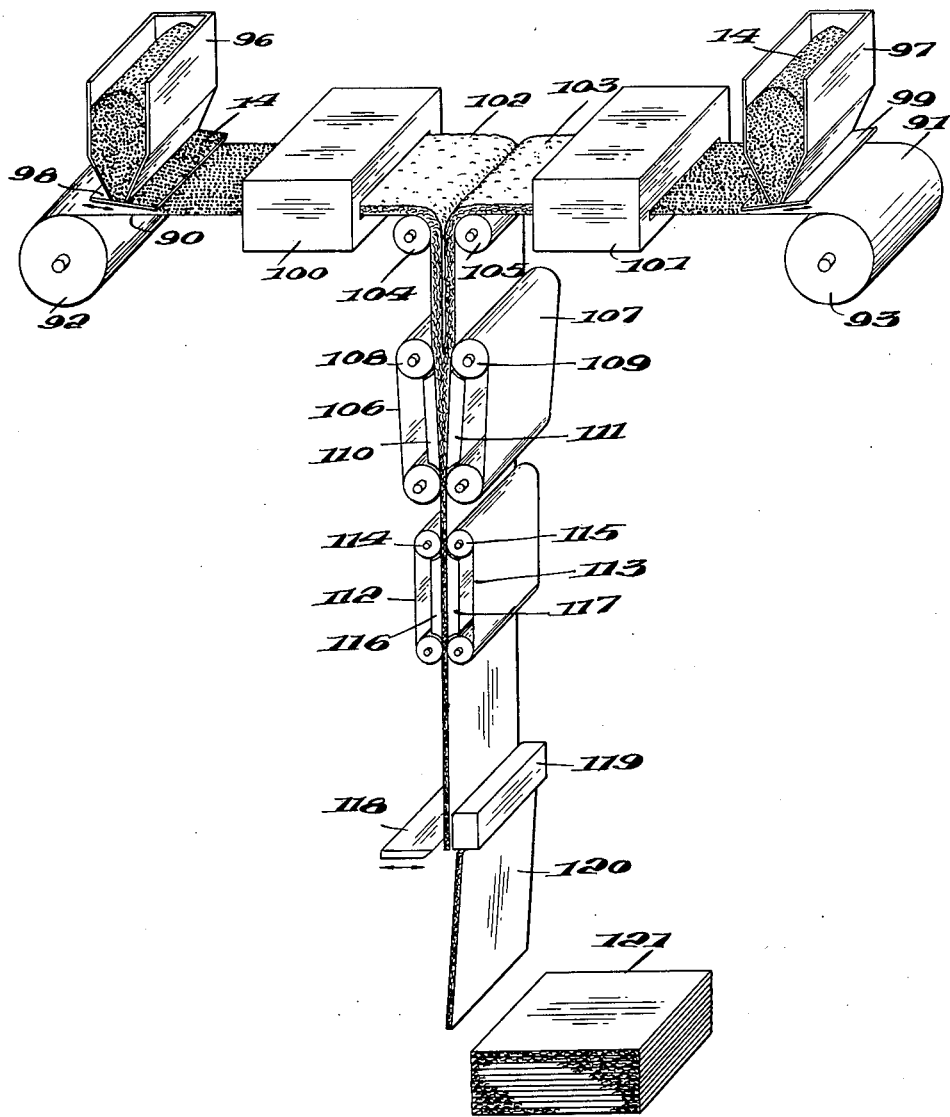
FIGURE 6 is a schematic view of another form of continuous process for making a panel.

Polystyrene beads of small diameter (approximately on the order of from less than .1 mm. to occasionally as large as 6 mm.) are produced in large quantities by methods which have no relevance to the present invention, with a foaming agent incorporated therein so that upon exposure to a temperature above about 160° F. (and as high as 250° F., if desired) for a few minutes the foaming agent causes the then softened plastic to expand so that each bead is formed into a much larger bead of foamed plastic. One commercial source for such beads, for example, is the Koppers Company, and such beads will be generally referred to hereinafter as "foamable polystyrene beads." Such beads may be expanded, that is, foamed slightly and the foaming may then be stopped or inhibited and then reinitiated at a later time to cause further expansoin and foaming to take place. Thus, for example, a layer of beads may be placed on a conveyor belt and caused to pass through an oven at a carefully regulated speed and temperature, the speed being so regulated that the beads pass through the oven in about 5 to 10 seconds, the speed further being regulated so that the beads expand say from two to two and one-half diameters, that is, the diameters of the beads are increased this much, and the beads are caused to pass out of the oven, thence into a cold-air stream so that further foaming and expansion is stopped and the beads are "frozen" in the thus expanded position. Such a process may be carried out at a temperature as low as 160° F. or as high as 250° F. for a time as low as 1 second or as great as 10 minutes to cause foamable polystyrene beads to expand to sizes wherein the diameters are from about 1.3 to about 3.5 times those prior to subjecting the beads to this process. Beads which have been subjected to such a process to cause part of the expansion of which they are capable to take place but to arrest the expansion short of the total of which they are capable will be referred to hereinafter as "pre-expanded foamable polystyrene beads." Both foamable polystyrene beads and pre-expanded foamable polystyrene beads are intended to be referred to be the term "beads" as used often alone hereinafter.

Beads which are partially foamed as described herein wherein the foaming action has been arrested after being only partially completed preferably have diameters in the range of .2 mm. to 12 mm. contain a plurality, usually several thousand, small discrete gas-containing cells or bubbles.

Although any sort of foamable polystyrene beads may be used and the particular nature of the foaming agent incorporated therein and the method of making the beads and incorporating such foaming agent therewithin is not a part of this invention, it may be mentioned that such beads are disclosed in U.S. Patent 2,744,291 and that preferred foaming agents are petroleum ether and pentane and there may be used such substances as hexane, heptane, cyclohexane, cyclopentane, cyclopentadiene and the like. Such compounds are volatile liquids substantially insoluble in water which boil in the range of 30° to 75° C. and which are non-solvents or only swelling agents for polystyrene. They are preferably incorporated within the polystyrene by polymerization of the polystyrene in the presence thereof but may be incorporated in the polystyrene by soaking the polystyrene for a period of in some cases as short as ten minutes and in other cases as long as sixty days in the desired foaming agent, it being desirable in some instances to incorporate in the foaming agent a small proportion of a solvent or swelling agent for polystyrene such as methylene chloride, acetone or the like.

Other foaming agents which may be utilized with perhaps less suitability include conventional blowing agents such as sodium bicarbonate.

In place of polystyrene beads there may be used beads of any foamable resin including thermosetting resins and thermoplastic resins, such as copolymers or interpolymers of styrene or a substituted styrene such as chlorostyrene, methylstyrene or divinyl benzene with acrylonitrile or butadiene or both; copolymers or interpolymers of acrylonitrile and butadiene or either with other conjugated diolefins; polyacrylonitrile, polyvinyl chloride; polyvinyl acetate; polyvinylidene chloride; copolymers of vinyl chloride with monomers containing terminal ethylenic unsaturations such as vinyl acetate, vinylidene chloride, styrene, acrylonitrile, acrylic and methacrylic acids and their esters, and the like; substituted styrenes such as chlorostyrene, methylstyrene and divinyl benzene; polyacrylonitrile; polymers and interpolymers of acrylic acid, of methacrylic acid, of chloroacrylic acid and of esters of either with saturated alcohols, unsaturated alcohols, such as allyl alcohol, dihydric alcohols such as glycol and other alcohols such as epoxide-containing alcohols; cellulose esters and ethers such as cellulose acetate, cellulose acetate-butyrate, cellulose acetate-propionate, cellulose nitrate and ethyl cellulose; polyethylene and substituted polyethylenes such as polyethylene terephthalate and halogenated polyethylenes such as polytrifluoromonochloroethylene and polytetrafluoroethylene. Also useful may be beads of compositions formed by compounding two or more of the above materials or beads of foamable thermosetting resins including epoxide, epoxypolyamide, polyurethane, phenolaldehyde, ureaaldehyde, melaminealdehyde and aniline-aldehyde. Polystyrene itself is generally preferred.

Rather than being beads as hereinbefore described, the particles of foamable polystyrene useful for the invention may be comminuted irregular particles made by grinding or comminuting a mass of polystyrene containing a suitable foaming agent as hereinbefore described. It is to be understood that use of the term "beads" herein is intended to include such irregular comminuted particles.

Particularly good results may be obtained by providing in the foamable resin a small percentage of finely divided carbon black or other heat absorbing coloring matter to facilitate heat absorption by the beads. An increase in expansion rate of from 1.5 to 10 times as represented by decrease in heating time required to expand the beads to a particular size may be obtained with from about .3% to about 2.5% finely divided carbon black incorporated in the composition, depending on size of carbon particles, degree and uniformity of dispersion and other factors.

Other compounding agents such as coloring matter, plasticizers, lubricants, fillers, antioxidants, flame retardents and the like may be added.

Referring now to the drawings, there is shown in FIGURE 1 a facing sheet 10 which may be in web form and may be paper, plastic film, reinforced plastic sheet, metal foil, aluminized plastic film, paper-foil laminate, plastic coated paper or paper-plastic film laminate, "plastic" being used herein to refer only to polymeric resinous materials. Disposed on a surface of facing sheet 10 there may be provided polystyrene beads 13. As shown, two such sheets 10, each provided with a layer of such beads, may be provided spaced apart from one another. The beads may be sparsely or thickly distributed. For purposes of simplicity in representation one of sheets 10 is shown with beads 11 forming a layer on the under surface thereof but in practice such sheet would normally be reversed so that the beads would lie on an upper surface thereof.

By subjecting the sheets and beads of FIGURE 1 to a temperature on the order of 160°–250° F. from about 1 second to 10 minutes there may be provided the article of FIGURE 2 wherein each of sheets 10 is adjacent to and adherent to foamed plastic bodies 17 formed from beads 13.

In order to make a suitable article for use according to the objects of the invention, I may then add an additional layer of sparsely distributed beads if the beads were originally sparsely distributed, and then repeat the foaming process, and may then again repeat such addition of beads and foaming as many times as necessary (from about 1 to 5 such repetitions being preferred) to provide the assembly of FIGURE 3. I then compress the assembly of FIGURE 3 between platens or rolls or other suitable means such as belts, as shown in FIGURE 5, for from a second or more at a higher temperature in the beads such as 250° F. to perhaps 2–5 minutes at a lower temperature such as 160° F. in the beads or even as much as 10 minutes to compress the assembly and to restrain it from outward expansion due to outward pressure exerted by the foam resin while hot. I then cool the assembly while still restraining outward expansion of the assembly due to expansion of the foam resin and thereby provide an article 19 as shown in FIGURE 4. The laminate thus provided is preferably reduced by at least 5% in thickness from the thickness of the assembly of FIGURE 3 and in some cases more, for example, by 75%.

The beads or the sheets 10 or both may be coated with adhesive prior to placing them together as in FIGURE 1 or the plastic bodies 17 may be thus coated prior to providing the assembly of FIGURE 3, but a structural panel is preferably provided by omitting all adhesive the sheets 10 being preheated so that they have a temperature in the range of about 200° F. to 300° F. at the time the beads 13 are applied thereto; I am unable to fully account for the relatively good strength of panels prepared in accordance with this embodiment but believe that the immediate initiation of foaming of the beads provides improved strength at bead to bead interfaces.

An adhesive for use in the invention is preferably, generally a synthetic resinous material but may be proteinaceous or may be based on natural resin or rosin such as gum acacia. It may be either liquid, solid or gaseous, being preferably a powdered solid. If gaseous, the compound applied is preferably not a true adhesive but is a compound adapted to cause the polystyrene to gain adhesivity, for example, is a solvent in gaseous form; a suitable adhesive in gaseous form may be a monomeric or prepolymeric material devoid of inhibitor and thereby adapted to become polymerized upon the application of additional heat and subsequent storage for a few days, for example, uninhibited methyl methacrylate. A preferred resin is a liquid such as a polyvinyl acetate latex or a natural or synthetic rubber latex, for example, an emulsion of water with either polyvinylacetate or a mixture of esters of methacrylic and acrylic acids such as, for example, methylmethacrylate, butyl methacrylate, and hexyl methacrylate and ethyl acrylate or a solvent solution of such thermoplastic polymers, for example, polyvinylchloride and polyvinylacetate, but may quite suitably be, for example, a powder of these same resins, or other resins, for example, a phenyl formaldehyde resin in the B state. Adhesive concentration if used may suitably be from about .3% to about 8% and preferably about .5% to about 2% of the weight of foamable resin.

The product which results if adhesive is applied by coating the beads with a dust of a phenol formaldehyde resin is especially strong. As suitable adhesives for this purpose there may be used, for example, a polyvinylacetate latex sold commercially by the Bakelite Company as Latex WC130 or a latex emulsion of a mixture of esters of acrylic and methacrylic acids sold commercially by Rohm & Haas Company as Latex WN80.

A process for continuously making structural panels is schematically shown in FIGURES 5a and 5b wherein webs 20 and 21 of paper or other facing material are continuously forwardly advanced respectively from let-off rolls 22 and 23. There is provided adjacent each of webs 20 and 21 a heating means such as infrared heaters 24 and 25 and also disposed adjacent the path of travel of each of the webs 20 and 21 respectively there is provided a plurality of hoppers 26a, 26b, 26c, 26d, 27a, 27b, 27c, 27d and distributing plates 28a, 28b, 28c, 28d, and 29a, 29b, 29c, 29d. Heating means such as infrared heating units 30a, 30b, 30c, 30d, 31a, 31b, 31c, 31d are disposed adjacent to webs so that each of the webs advance under one of such units shortly after passing under each of the distributing plates.

Each of the hoppers contains foamable polystyrene resin beads 13. From the bottom of the edge of the hoppers such as 26a, the beads feed out to the distributing plates such as plate 28a which are caused to have a vibratory oscillating motion by vibratory driving means which for the sake of simplicity in illustration are not shown. By reason of the vibratory motion of the feeding plates such as plate 28a, beads are caused to be relatively evenly and randomly distributed on the web from the lower edge of each such plate at a predeterminable rate which may be controlled by adjusting the size of the slot at the bottom of the hopper, by adjusting the slope of the plate, by adjusting the distance between the plate and the slot at the bottom of the hopper, or by adjusting the frequency or amplitude of the vibration of the plate, or by adjustment of two or more of these variables at the same time. Generally, it is sufficient to obtain flow rates within generally desired ranges, to adjust the amplitude of the vibrations. Other heating means such as for example hot air ovens may of course be utilized in place of the aforementioned infrared heating units.

Disposed adjacent to one of the webs such as for example, web 21, there is provided direction changing roll 35 adapted to cause web 21 to reverse direction and travel in proximal relation to web 20. Disposed in such relation that the two webs may then travel conjointly therethrough there are provided belts 36 and 37 adapted to exert and maintain pressure against the article therebetween by reason of pressure exerted against the belts by shoes 38 and 39 and idler rolls 40 and 41. Belts 36 and 37 may travel over rolls 42 and 43 respectively.

Adjacent belts 36 and 37 there are provided belts 46 and 47 which may travel over rolls 48 and 49 respectively and may be adapted to exert and maintain pressure against an article thereinbetween by reason of pressure exerted against inner faces of the belts by shoes 50 and 51. Means such as electrical heating units 45 within shoes 38 and 39 are provided to introduce heat into the article between belts 36 and 37 as the article passes thereinbetween and means such as cooling units 55 within shoes 50 and 51 are provided to remove heat from the article between belts 46 and 47 as it passes thereinbetween. In place of heating and cooling units respectively contained within the shoes there may be provided other heating and cooling means such as for example a heated cabinet or oven may be provided substantially entirely surrounding the belts 36 and 37 and a refrigerated cabinet may be provided substantially entirely surrounding belts 46 and 47.

In the operation of the process of my invention, webs 20 and 21 are pulled off respectively from let-off rolls 22 and 23 which may be provided with suitable breaking or drag means (for the sake of simplicity not illustrated) adapted to provide any necessary such degree of back tension in the webs as may be necessary in any manner such as one of those previously well known to the art. Webs 20 and 21 travel at substantially identical speeds after leaving rolls 22 and 23 by reason of being drawn conjointly between powered belts 36 and 37 or belts 46 and 47, or both which may exert a driving, pulling action thereon. After passing from rolls 22 and 23, webs 20 and 21 preferably respectively pass under heaters 24 and 25 and are heated to a temperature of between 200° to 300° F. Web 20 then passes under distributing plate 28a where it is provided with a sparsely distributed layer of foamable polystyrene beads as shown at 60 and then passes under heating unit 30a whereby said beads are heated to a temperature of from 160° to 250° F. for from 1 second to 10 minutes whereby the beads are partially foamed thus providing a layer of somewhat or partially foamed beads on the web as shown at 61. Foaming of the foamable beads by application of heat from heating unit 30a and from subsequent heating units is sufficient to produce a foam body but is stopped at such a point that the body or bodies can be further foamed in a subsequent step. The web then passes under plate 28b whereby an additional layer of foamable beads is provided on said web in conjunction with said previously foamed beads so that the beads distributed from plate 28b are interspersed with, or scattered on top of, said beads as shown at 62. The web then passes under heating unit 30b whereby the beads distributed on to the web from plate 21b are foamed to at least some extent to provide resin foam on the top of the web as shown at 63. Web then passes under plate 28c whereby an additional layer of foamable beads is distributed on the web in conjunction with the resin foam previously on the web as shown at 64 and the web then passes under heating unit 30c whereby the beads distributed on the web from plate 28c are at least partially foamed to provide resin foam on the web as shown at 65. The web may then pass under plate 28d whereby an additional layer of foamable beads is provided on the web in conjunction with resin foam previously on the web as shown at 66 and the web may then pass under heating unit 30d whereby the beads distributed from plate 28d are partially foamed and there is provided on web 20 a foamed body or web 67 which may be further foamed.

Web 21 may likewise simultaneously be provided with repeated applications of beads from plates 29a, 29b, 29c, 29d. The beads distributed on the web from each of these plates may be foamed to such an extent that they may be further foamed in a subsequent step; this being accomplished for each layer by application of heat from heating units 31a, 31b, 31c and 31d prior to passage of the web to the next adjacent distributing plate, so that web 21 is thus simultaneously provided with foam body or web 77 which may be further foamed. Web 21 may then pass over direction-changing roll 35 while body 77 is sufficiently hot to bend easily.

Bodies 67 and 77 are thus brought into proximal contacting relation to provide an assembly as shown at 80 comprising facing sheets 20 and 21 and bodies 67 and 77. The assemblies may then pass between belts 36 and 37 with shoes 38 and 39 and idlers 40 and 41 being so arranged that the assembly is compressed to some extent before reaching idlers 40 and 41, its thickness being reduced preferably by at least 5% and generally at least 10%, and in some cases as much as 75% from the thickness of the assembly as shown at 80. As the assembly passes between belts 36 and 37, it is heated by means provided within the shoes or surrounding the belts as previously mentioned, whereby the foamable synthetic resin is caused to further foam to some extent to provide a single foam mass or body as at 81 between and adherent to webs 20 and 21; the belts 36 and 37 being adapted to exert pressure on and maintain the reduced thickness of the assembly as it passes thereinbetween. The assembly may then pass between belts 46 and 47 which may be adapted to maintain the said reduced thickness while the web is cooled, heat being withdrawn therefrom by the aforementioned cooling unit. There is thus provided a continuous panel article as shown at 82 comprising two facing sheets with a body of synthetic resin foam therein-between, and such article may be cut into a plurality of discrete articles by cut-off saw 84.

If each of webs 67 and 77 is, for example, .250" thick and each of webs 20 and 21 is about .010" thick a panel may suitably have a thickness of from about .495" to as little as 200".

Although the application of four separate layers of beads to each of the webs has been illustrated in FIGURE 5, with heating and resultant foaming of each of these layers before the application of the next layer, there may suitably be provided a greater or lesser number of layers, heating and foaming of each of layers being accomplished before the application of the next succeeding layer. Thus suitable results may be obtained in some instances if only one relatively more concentrated layer is provided on each of the webs as illustrated in FIG. 6 and is then foamed to provide respectively bodies 67 and 77, or two or three layers, or as many as ten layers may be successively applied, each layer being partially foamed before application of the next succeeding layer. The number of layers to be applied will generally be determined by the speed at which it is desired that the article be produced. Because it is much easier to introduce heat into a single layer of beads, it has been found far more effective to provide a relatively thick resin body on a web of facing sheet material by successively providing a relatively large number of thin layers i.e., sparsely or thinly distributed layers of beads and heating each layer to partially foam the beads therein before applying the next layer than to provide a single thick layer of beads and then introduce heat into such a thick layer in order to cause it to become foamed. Furthermore, the utilization of two relatively concentrated layers, one being on each web of facing material, has the additional disadvantage that the sidewise expansion of the beads in such a layer causes the foamed body produced therefrom to be badly buckled. In addition, an important advantage of the process of my invention is that a foam resin body may be more homogeneously provided, that is, it may be provided with less variation in density throughout its interior by the application of repeated layers of beads, each layer being foamed before application of the next layer.

It is desirable to avoid, or at least to minimize, clusters of beads in the application of each of the layers in order to obtain such homogeneity or to avoid such density variation. The presence of clusters is generally minimized by the use of any suitable means such as the vibratory plates illustrated for providing relatively evenly distributed thin layers of beads on the webs. In forming a thick article such as I might provide in accordance with my invention by the application of perhaps five layers of beads to each of two webs, it is thus possible to minimize such density variation.

An advantage of my invention results from the greater speed with which the article can be produced by reason of the repeated introduction of relatively thin layers of beads because each bead is directly exposed to a source of heat at the time it is to be foamed and it is not necessary for heat to pass through some of the beads to reach others. This same advantage may however be realized to a greater or lesser extent, depending on the thickness of the article to be produced if only one layer of beads is provided on each of the two webs.

In place of pre-heating each of the webs by means of heating units 24 and 25 prior to distributing the first layer of beads on the webs in order to enhance adhesion of the foam to the webs, such result may suitably be accomplished by increasing the amount of heat introduced into the first layer of beads following their distribution on the webs such as for example by increasing the length of heating units 30a and 31a in the direction of travel of the webs.

As the assembly is compressed by belts 36 and 37 between points 80 and 81, a certain amount of foam may be squeezed out or may expand out, or may foam out sidewise so that the edges of the article as produced at 82 may be uneven. These edges may be trimmed by any suitable means, not illustrated, such as knife or disc or saw or hot wire trimmer. Alternatively, if desired, traveling belts may be provided adjacent belts 36 and 37 in such manner as to exert pressure laterally inwardly on the edges of the assembly as it passes between belts 36 and 37 and likewise such belts may be provided to exert pressure laterally inwardly on the assembly as it passes between belts 46 and 47 thereby providing relatively smooth even vertical edges on the article as produced at 82.

A process for continuously making structural panels is schematically shown in FIGURE 6 wherein webs 90 and 91 of facing material are continuously forwardly advanced respectively from let-off rolls 92 and 93. Foamable beads 14 which in the embodiment illustrated may preferably be beads coated with adhesive are contained in hoppers 96 and 97 and feed out from the bottom thereof onto plates 98 and 99 which are caused to have a vibratory oscillating motion in the direction of the arrows by suitable supporting means which for the sake of simplicity are not shown. Plates 98 and 99 cause the beads 14 to be deposited upon the upper surfaces of webs 90 and 91 in a relatively uniformly distributed layer of uniform thickness. Prior to application of beads thereto, webs 90 and 91 may be preheated to from about 200° F. to 300° F., if desired, by any suitable heating means, which for the sake of simplicity are not shown. The webs thus provided with beads 14 may be heated in any suitable manner, for example, by causing them to be passed through ovens 100 and 101 in order to cause the beads to be heated to a temperature on the order of from 160–250° F. for a period of at least about 1 second and as much as 2 or 3 minutes or even 10 minutes whereby the beads are caused to foam. Webs 90 and 91 as they emerge from ovens 100 and 101 are thus provided respectively with webs of foamed plastic 102 and 103 disposed adjacent thereto.

The direction of both webs is then changed by causing them to pass over direction changing rolls 104 and 105 and thence downwardly between heated compressing belts 106 and 107 which travel around rolls 108 and 109 and are maintained against the inwardly exerted pressure of the assembly by backing shoes 110 and 111 whereby the thickness of the foamed plastic body between the two webs is reduced by at least 5% and preferably to 90% or less of the combined thickness of the original webs. Belts 106 and 107 may be heated by any suitable means. The resultant laminate may then pass between cooling belts 112 and 113 which may travel around rolls 114 and 115 and be maintained against the outwardly exerted pressure of the assembly by back-up shoes 116 and 117 and may then be cut into sheets. The bolts may be cooled by any suitable means (for simplicity not shown) such as by cold air blown thereagainst or by passing through cold fluid bath or by shoes 116 and 117 being refrigerated. The cutting into sheets may be accomplished for example, by shear blade 118 operating in the direction shown by the arrows, against stop 119 to provide structural panels such as panel 120 which may be stacked in any suitable manner, for example as shown at 88.

Although certain methods for heating the beads in order to cause them to foam either before or after running the two webs into contacting relation have been described herein, I may utilize any suitable method for heating the beads including heating with hot air, with moist hot air, with steam preferably at 100° C. to 300° C., by infrared radiation, in electric high frequency fields or by contact with hot liquids which do not dissolve the thermoplastic substances such as water, ethylene glycol and glycerine as disclosed in U.S. Patent 2,744,291. Thus heat may suitably be provided by causing steam to impinge on the beads or by placing them under a radiant heat source, or in a hot air oven, or over or under a gas flame or electrical resistance element, or by dielectric heating.

Although paper and other materials have been heretofore described as materials suitable for face sheets, the facing sheets may be any suitable material found useful in the art such as for example, glass reinforced synthetic resin, aluminum, steel, stainless steel, plywood, varnished cloth, cardboard or the like.

Other metals may be used, including such metals as copper, tin, brass and the like. A facing sheet material which is in some cases particularly suitable is made by impregnating a woven or unwoven glass fabric with a polyester resin. Such polyester resins comprise the reaction product of a dihydric alcohol such ethylene glycol, propylene glycol, hexamethylene glycol, glycerol or the like with one or more polybasic acids such as succinic, glutaric, adipic, pimelic, suberic, azelaic and sebacic acids, unsaturated dibasic acids such as maleic acid and fumaric acid aromatic dibasic acids such as phthalic acid, together with a compound containing a terminal ethylenic unsaturation through which polymerization may take place such as methylmethacrylate, methylacrylate, styrene, divinyl benzene, diallyl phthalate, diallyl phosphonate, vinyl chloride or vinyl acetate and additionally together with, in some cases, an unsaturated monocarboxylic acid such as palmitoleic, oleic, ricinoleic, linoleic, or linolenic acids. Monomers which may be utilized in preparing polymers suitable for facing sheets or polymers for facing sheets, as the case may be, include esters of acrylic and methacrylic acids, ethylene, tetrafluoroethylene, monochlorotrifluoroethylene, isobutylene, allyl starch, cellulose esters such as cellulose acetate, cellulose acetate butyrate and cellulose nitrate, cellulose ethers such as ethyl cellulose, chlorinated paraffins, chlorinated rubber, coumarone resins, cyclicized rubber, epoxy resins (epichlorohydrin bisphenol resins), furane resins, hydrocarbon resins, melamine-aldehyde resins, urea-aldehyde resins, aniline-aldehyde resins, phenol-aldehyde resins, polyamide resins, polyamide-epoxy resins, synthetic rubbers, including polychloroprene, butadiene-styrene, butadiene-acrylonitrile, isoprene-isobutylene, isoprene-styrene, polysulfide, polyacrylic, silicone resins, silicone alkyd resins, silicone phenolic resins, silicone rubber, styrene, styrene-butadiene, vinyl acetate, vinyl chloride, vinyl chloride-acetate, vinylidene chloride, vinyl chloride-vinylidene chloride, vinyl ether, vinyl formal, vinylidene-acrylonitrile, styrene-acrylonitrile, butadiene-styrene-acrylonotrile, and the like. It is not possible to set forth all resinous materials which would be suitable but it should be clear that no limitation is intended by the specific resinous materials set forth as resinous materials which may be suitably utilized as facing sheets. As a film, polyethylene terephthalate may be particularly suitable as a facing sheet, for certain applications. Many of these materials may be particularly suitable for certain decorative or partially decorative applications of one sort or another and for such applications there may be suitably utilized leather, wood veneers and fabrics of cotton, linen, hemp, jute, wool and synthetic fibers and other suitable materials.

The facing sheets in a structural panel prepared in accordance with the invention need not be of like or similar materials. Either can be any suitable material for a facing sheet as described herein.

Preferably the thickness of the layer of foamed polystyrene between the facing sheets should be at least about four times as great as the thickness of either of the facing sheets in order to provide a suitable bending strength over a wide span, that is, to provide a tensile stress in either facing sheet of less than its ultimate value for most loads, such thickness preferably being provided by providing a web of foamed polystyrene adjacent each facing sheet of such thickness so that after being first foamed it may be pressed to a lesser thickness in forming a finished article.

I may incorporate within the foamed plastic body of the structural panel a reinforcing member such as wire screen, expanded metal mesh, or fabric which is preferably made with fibers or filaments of a synthetic resinous material of high tensile strength such as a polyamide, polyethylene terephthalate, polyacrylic resin, glass, rayon or the like or of modified natural fiber such as, for example, cyanoethylated cotton; such fabric may be woven or non-woven fabric or in place of such fabric there may be used, though less suitably, a mat of such fibers disposed in random orientation with respect to one another. I may include such reinforcing material at or near the surface on either or both sides of the panel or in some cases contained in the foam resin body nearer the center of the panel instead of or in addition to such material at one or both of the surfaces.

Having thus disclosed my invention, I claim:

1. Method of making a panel article comprising two facing sheets with a body of synthetic resin foam therein-between and adherent thereto comprising the steps forming each of two articles each comprising a sheet of facing material and an adjacent body of synthetic resin foam by providing at least one sparsely distributed layer of foamable synthetic resin beads on a surface of each of two sheets of facing material, then applying heat to said layer thereby causing said beads to at least partially foam, and then providing an additional layer of foamable synthetic resin beads thereon and again applying heat thereto to thereby cause said beads to at least partially foam, then placing in contact said two articles with the resin foam portions thereof in proximal contacting relation, then applying pressure to reduce by at least 5% the distance between facing sheets and heating to cause additional foaming of said resin while maintaining said reduced thickness, then cooling while maintaining said reduced thickness to provide said panel article.

2. Method of making a panel article comprising two facing sheets with a body of synthetic resin foam thereinbetween and adherent thereto comprising the steps of repeatedly distributing layers of foamable synthetic resin beads on at least one surface of each of two sheets of facing material and then applying heat to each of said layers before application of the next such layer to cause the beads in each such layer to at least partially foam before application of the next such layer, to thereby form each of two articles each comprising a sheet of facing material and an adjacent body of synthetic resin foam and then placing in contact said two articles with the resin foam portions thereof in proximal contacting relation, then applying pressure to reduce by at least 5% the distance between facing sheets and heating to cause additional foaming of said resin while maintaining said reduced thickness, then cooling while maintaining said reduced thickness to provide said panel article.

3. Method of making a panel article comprising two webs of facing sheet material with a web of synthetic resin foam thereinbetween and adherent thereto comprising the steps of continuously simultaneously advancing each of two webs of facing material, applying to each of said webs a layer of foamable synthetic resin beads, then advancing each of said webs through a heating means to thereby cause said beads to at least partially foam, thus forming each of two webs of composite material, each comprising a web of synthetic resin foam and a web of facing sheet material, then continuously advancing into contacting relation said composite webs with the resin foam web portions thereof in proximal contacting relation, then continuously applying pressure to reduce by at least 5% the distance between facing sheets and continuously heating to cause additional foaming of said resin while maintaining said reduced thickness and then continuously cooling while maintaining said reduced thickness to provide said panel article.

4. Method of making a panel article comprising two webs of facing sheet material with a web of synthetic resin foam thereinbetween and adherent thereto comprising the steps of continuously simultaneously advancing each of two webs of facing material, applying to each of said webs a sparsely distributed layer of foamable synthetic resin beads, then advancing each of said webs through a heating means to thereby cause said beads to at least partially foam and continuously advancing each of two webs of facing material having a layer of synthetic resin foam thereon, applying an additional layer of foamable beads thereon and then advancing each of said webs through a heating means to thereby cause said beads to at least partially foam, thus forming each of two webs of composite material, each comprising a web of synthetic resin foam and a web of facing sheet material, then continuously advancing into contacting relation said composite webs with the resin foam web portions thereof in proximal contacting relation, then continuously applying pressure to reduce by at least 5% the distance between facing sheets and continuously heating to cause additional foaming of said resin while maintaining said reduced thickness and then continuously cooling while maintaining said reduced thickness to provide said panel article.

5. Method of making a panel article comprising two webs of facing sheet material with a web of synthetic resin foam thereinbetween and adherent thereto comprising the steps of continuously simultaneously advancing each of two webs of facing material, applying to each of said webs a layer of foamable synthetic resin beads, then advancing each of said webs through a heating means to thereby cause said beads to at least partially foam, thus forming each of two webs of composite material, each comprising a web of synthetic resin foam and a web of facing sheet material and repeatedly distributing layers of foamable synthetic resin beads on each of said webs of facing material and continuously advancing each of said webs through a heating means before the application of the next such layer to thereby cause said beads to at least partially foam before application of the next such layer, then continuously advancing into contacting relation said composite webs with the resin foam web portions thereof in proximal contacting relation, then continuously applying pressure to reduce by at least 5% the distance between facing sheets and continuously heating to cause additional foaming of said resin while maintaining said reduced thickness and then continuously cooling while maintaining said reduced thickness to provide said panel article.

6. Method of making a panel article comprising two facing sheets with a body of synthetic resin foam thereinbetween and adherent thereto comprising the steps of repeatedly distributing layers of foamable synthetic resin beads on at least one surface of each of two sheets of facing material and then applying heat to each of said layers before application of the next such layer to cause the beads in each such layer to at least partially foam before application of the next such layer, to thereby form each of two articles each comprising a sheet of facing material and an adjacent body of synthetic resin foam and then placing in contact said two articles with the resin foam portions thereof in proximal contacting relation, then applying pressure to reduce by at least 5% the distance between facing sheets and then cooling while maintaining said reduced thickness to provide said panel article.

7. Method of making a panel article comprising two webs of facing sheet material with a web of synthetic resin foam thereinbetween and adherent thereto comprising the steps of continuously simultaneously advancing each of two webs of facing material, applying to each of said webs a sparsely distributed layer of foamable synthetic resin beads, then advancing each of said webs through a heating means to thereby cause said beads to at least partially foam, thus forming each of two webs of composite material, each comprising a web of synthetic resin foam and a web of facing sheet material, then continuously advancing into contacting relation said composite webs with the resin foam web portions thereof in proximal contacting relation, then continuously applying pressure to reduce by at least 5% the distance between facing sheets and then continuously cooling while maintaining said reduced thickness to provide said panel article.

References Cited in the file of this patent

UNITED STATES PATENTS

| | | |
|---|---|---|
| 1,924,635 | Buffington | Aug. 29, 1933 |
| 2,434,527 | Untiedt | Jan. 13, 1948 |
| 2,567,952 | Lewis | Sept. 18, 1951 |
| 2,576,073 | Kropa et al. | Nov. 20, 1951 |
| 2,744,291 | Stastny et al. | May 8, 1956 |
| 2,770,406 | Lane | Nov. 13, 1956 |
| 2,787,809 | Stastny | Apr. 9, 1957 |
| 2,861,046 | Stastny | Nov. 18, 1958 |
| 2,862,834 | Hiler | Dec. 2, 1958 |
| 2,866,730 | Potchen et al. | Dec. 30, 1958 |
| 2,872,965 | Sisson | Feb. 10, 1959 |
| 2,894,918 | Killoran et al. | July 14, 1959 |

FOREIGN PATENTS

| | | |
|---|---|---|
| 706,109 | Great Britain | Mar. 24, 1954 |